United States Patent
Byers et al.

(10) Patent No.: US 9,667,635 B2
(45) Date of Patent: May 30, 2017

(54) CREATING THREE-PARTY TRUST RELATIONSHIPS FOR INTERNET OF THINGS APPLICATIONS

(71) Applicant: Cisco Technology, Inc., San Jose, CA (US)

(72) Inventors: Charles Calvin Byers, Wheaton, IL (US); Toerless Eckert, Mountain View, CA (US); Faisal Siyavudeen, Cochin (IN)

(73) Assignee: Cisco Technology, Inc., San Jose, CA (US)

( * ) Notice: Subject to any disclaimer, the term of this patent is extended or adjusted under 35 U.S.C. 154(b) by 105 days.

(21) Appl. No.: 14/669,086

(22) Filed: Mar. 26, 2015

(65) Prior Publication Data

US 2016/0285891 A1   Sep. 29, 2016

(51) Int. Cl.
*H04L 29/06* (2006.01)

(52) U.S. Cl.
CPC ...... *H04L 63/1408* (2013.01); *H04L 63/0884* (2013.01); *H04L 63/105* (2013.01); *H04L 63/108* (2013.01)

(58) Field of Classification Search
CPC ..... H04L 63/00; H04L 63/02; H04L 63/0227; H04L 63/029; H04L 63/08; H04L 63/0853; H04L 63/0876; H04L 63/0884; H04L 63/10; H04L 63/105; H04L 63/107; H04L 63/108; H04L 63/123; H04L 63/14; H04L 63/1408; H04L 63/1441; H04L 63/1466; H04L 67/14; H04L 67/141; H04L 67/143
See application file for complete search history.

(56) References Cited

U.S. PATENT DOCUMENTS

| | | | |
|---|---|---|---|
| 5,442,708 A * | 8/1995 | Adams, Jr. ......... | H04L 63/0428 370/401 |
| 7,249,262 B2 * | 7/2007 | Hauck ................. | H04L 63/08 709/219 |
| 7,316,027 B2 | 1/2008 | Burch et al. | |
| 7,451,305 B1 | 11/2008 | Pritikin | |
| RE42,042 E * | 1/2011 | Kikinis ............... | H04L 12/2856 370/352 |
| 7,924,709 B2 * | 4/2011 | Lynn ................... | G06F 21/00 370/230 |
| 7,924,825 B2 * | 4/2011 | Dowling ............. | G06Q 20/04 370/352 |
| 8,601,102 B1 * | 12/2013 | Lee ..................... | H04L 67/141 709/223 |
| 8,755,394 B2 | 6/2014 | Kaluskar et al. | |

(Continued)

*Primary Examiner* — Eric W Shepperd
(74) *Attorney, Agent, or Firm* — Edell, Shapiro & Finnan, LLC

(57) ABSTRACT

A trust relationship is established at a first network connected device between the first network connected device and a second network connected device. A communication session is established between the first network connected device and a third network connected device, wherein the third network connected device lacks a trust relationship with the second network connected device. A message is sent from the first network connected device to establish a communication session between the third network connected device and the second network connected device based on the trust relationship between the first network connected device and the second network connected device.

24 Claims, 13 Drawing Sheets

(56) References Cited

U.S. PATENT DOCUMENTS

| | | | |
|---|---|---|---|
| 8,776,179 B2 | 7/2014 | Bansal et al. | |
| 8,776,209 B1* | 7/2014 | Kumar | H04L 63/0272 380/270 |
| 8,949,938 B2 | 2/2015 | Sowatskey et al. | |
| 9,077,709 B1* | 7/2015 | Dall | H04L 63/0823 |
| 2002/0188744 A1* | 12/2002 | Mani | H04L 29/06027 709/231 |
| 2003/0149887 A1* | 8/2003 | Yadav | G06F 21/55 726/23 |
| 2005/0188212 A1* | 8/2005 | Laferriere | H04L 63/0807 713/185 |
| 2005/0268328 A1* | 12/2005 | Corliano | H04L 12/1818 726/3 |
| 2006/0143295 A1* | 6/2006 | Costa-Requena | H04L 63/0428 709/227 |
| 2007/0056020 A1* | 3/2007 | Ward | H04L 67/10 726/3 |
| 2007/0208936 A1* | 9/2007 | Ramos Robles | H04L 63/0815 713/168 |
| 2007/0254630 A1 | 11/2007 | Moloney et al. | |
| 2008/0115203 A1* | 5/2008 | Elzur | H04L 63/08 726/12 |
| 2009/0077636 A1* | 3/2009 | Duffie, III | G06F 21/335 726/5 |
| 2010/0251127 A1* | 9/2010 | Geppert | G06F 3/04817 715/735 |
| 2011/0182303 A1* | 7/2011 | Le Faucheur | H04L 47/745 370/468 |
| 2011/0231659 A1* | 9/2011 | Sinha | H04L 63/06 713/168 |
| 2013/0007867 A1 | 1/2013 | Sowatskey et al. | |
| 2013/0135523 A1* | 5/2013 | Ramalho | H04N 21/2402 348/441 |
| 2013/0198509 A1* | 8/2013 | Buruganahalli | H04L 67/146 713/151 |
| 2014/0047532 A1 | 2/2014 | Sowatskey et al. | |
| 2014/0123214 A1* | 5/2014 | Black | G06F 21/6218 726/1 |
| 2014/0269537 A1* | 9/2014 | Kemmerer, Jr. | H04W 80/04 370/329 |
| 2014/0289826 A1* | 9/2014 | Croome | H04L 67/141 726/5 |
| 2015/0123606 A1* | 5/2015 | Tew | H02J 7/025 320/108 |
| 2015/0134967 A1* | 5/2015 | Moore | H04L 9/3263 713/175 |
| 2015/0181370 A1* | 6/2015 | French | H04W 4/02 455/456.6 |
| 2016/0142409 A1* | 5/2016 | Frei | H04L 63/0884 713/176 |
| 2016/0191526 A1* | 6/2016 | Panchapakesan | H04L 63/10 726/1 |
| 2016/0232515 A1* | 8/2016 | Jhas | G06Q 30/02 |
| 2016/0295622 A1* | 10/2016 | Huang | H04W 4/008 |
| 2016/0379101 A1* | 12/2016 | Hammad | G06K 19/06206 235/380 |
| 2016/0381025 A1* | 12/2016 | Foerster | G06Q 10/083 726/4 |

* cited by examiner

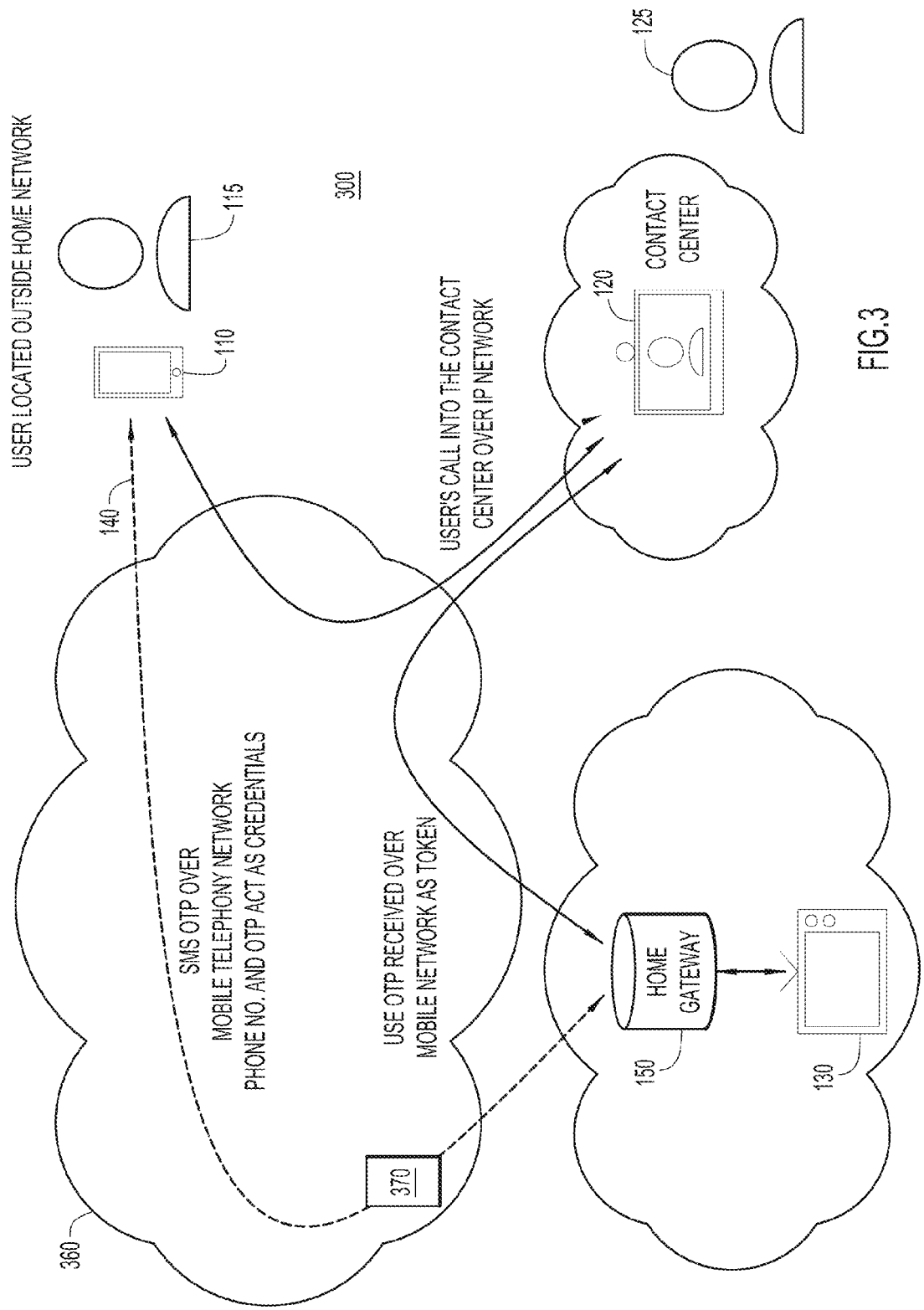

400

410 — ESTABLISH, AT A FIRST NETWORK CONNECTED DEVICE, A TRUST RELATIONSHIP BETWEEN THE FIRST NETWORK CONNECTED DEVICE AND A SECOND NETWORK CONNECTED DEVICE

420 — ESTABLISH A COMMUNICATION SESSION BETWEEN THE FIRST NETWORK CONNECTED DEVICE AND A THIRD NETWORK CONNECTED DEVICE, WHEREIN THE THIRD NETWORK CONNECTED DEVICE LACKS A TRUST RELATIONSHIP WITH THE SECOND NETWORK CONNECTED DEVICE

430 — SEND A MESSAGE FROM THE FIRST NETWORK CONNECTED DEVICE TO ESTABLISH A COMMUNICATION SESSION BETWEEN THE THIRD NETWORK CONNECTED DEVICE AND THE SECOND NETWORK CONNECTED DEVICE BASED ON THE TRUST RELATIONSHIP BETWEEN THE FIRST NETWORK CONNECTED DEVICE AND THE SECOND NETWORK CONNECTED DEVICE

FIG.4A

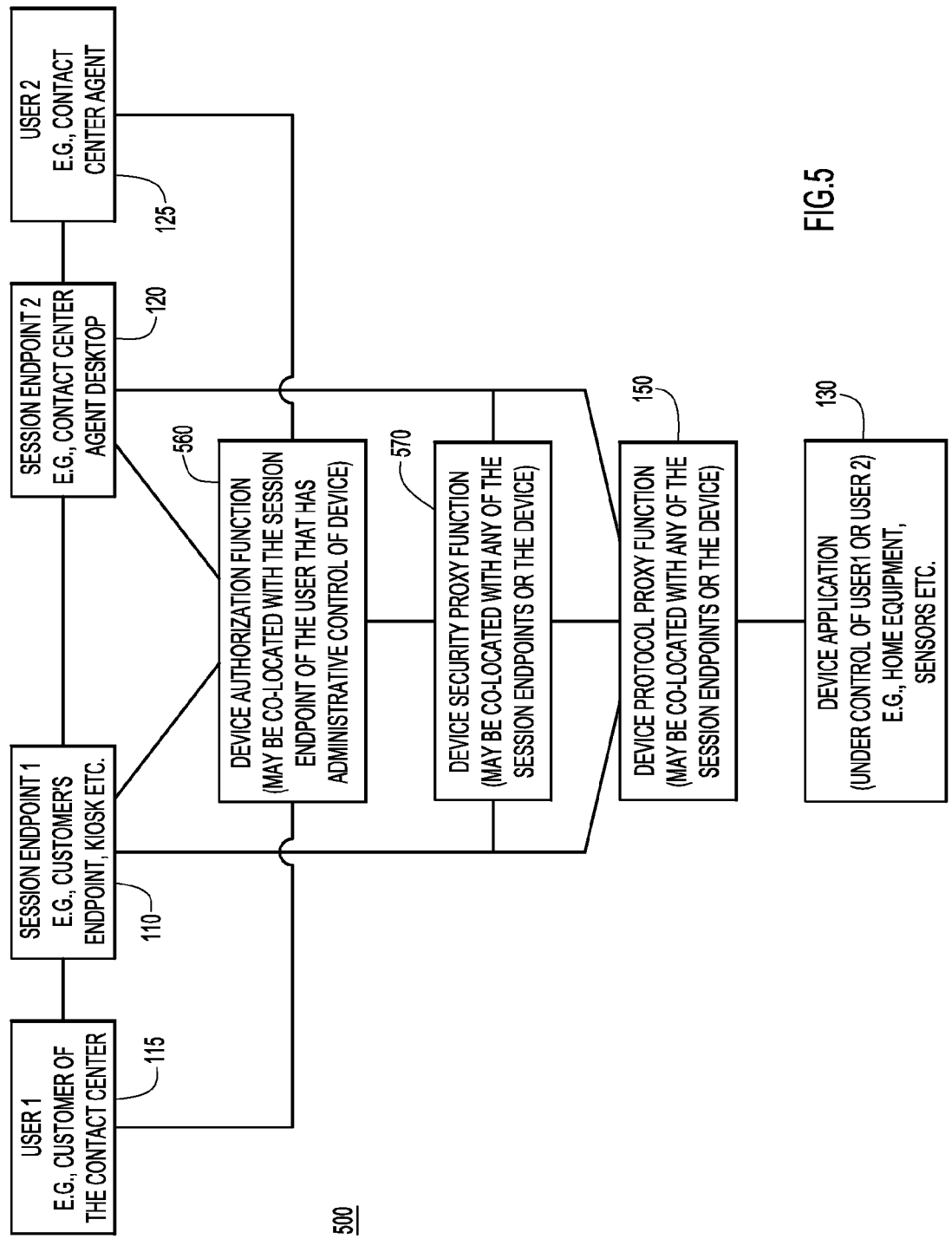

CREATING THREE-PARTY TRUST RELATIONSHIPS FOR INTERNET OF THINGS APPLICATIONS

TECHNICAL FIELD

The present disclosure relates to Internet of Things devices, and in particular, granting secure access to third parties to Internet of Things devices.

BACKGROUND

In the Internet of Everything, many different devices will be accessed by many different entities. These devices may include, but are not limited to including, information technology devices (computers, smartphones, printers, storage, networking gear), sensors (environmental, security, industrial, energy, medical, etc.), and actuators (doors, climate control, displays, media devices, vehicles, etc.). The entities seeking access to these devices may be the devices' owner, family, friends, call center agents, service technicians, cloud applications, and various artificial intelligence ("AI") entities, as well as unwelcome individuals (e.g., "hackers"). The access provided to these devices may depend on the entity that seeks access, the resources on the devices to which access is requested, the mode of access and environmental parameters specific to or not specific to the functionality of the device (e.g., time of the day, location of the device etc.).

Today, granting entities appropriate level of access to the devices for an appropriate interval of time is challenging, cumbersome, and error prone. Providing such access requires session and signaling and trust establishment between three parties, e.g., the entity that seeks access, the individual that has the power to administer the device and the device itself. Establishing these trust relationships may be difficult as the number of devices/sensors in a home or other customer premise may be quite large. Furthermore, creating separate 3-party trust relationships with each of the devices may be cumbersome, and the devices may be operating under constrained operating conditions with limits on power usage, processing capability, and cryptographic capabilities. Furthermore, in some situations, the administrator of a device may want to monitor the access to the device and revoke access rights at any time.

BRIEF DESCRIPTION OF THE DRAWINGS

FIG. 3 is an illustration of a third network environment configured to create three-party trust relationships, according to an example embodiment.

FIG. 4A is a flowchart illustrating a process for creating three-party trust relationships, according to an example embodiment.

FIG. 5 is a block diagram illustrating the functional units of a system configured to create three-party trust relationships, according to an example embodiment.

DESCRIPTION OF EXAMPLE EMBODIMENTS

Overview

A trust relationship is established at a first network connected device between the first network connected device and a second network connected device. A communication session is established between the first network connected device and a third network connected device, wherein the third network connected device lacks a trust relationship with the second network connected device. A message is sent from the first network connected device to establish a communication session between the third network connected device and the second network connected device based on the trust relationship between the first network connected device and the second network connected device.

Example Embodiments

Figure 1:
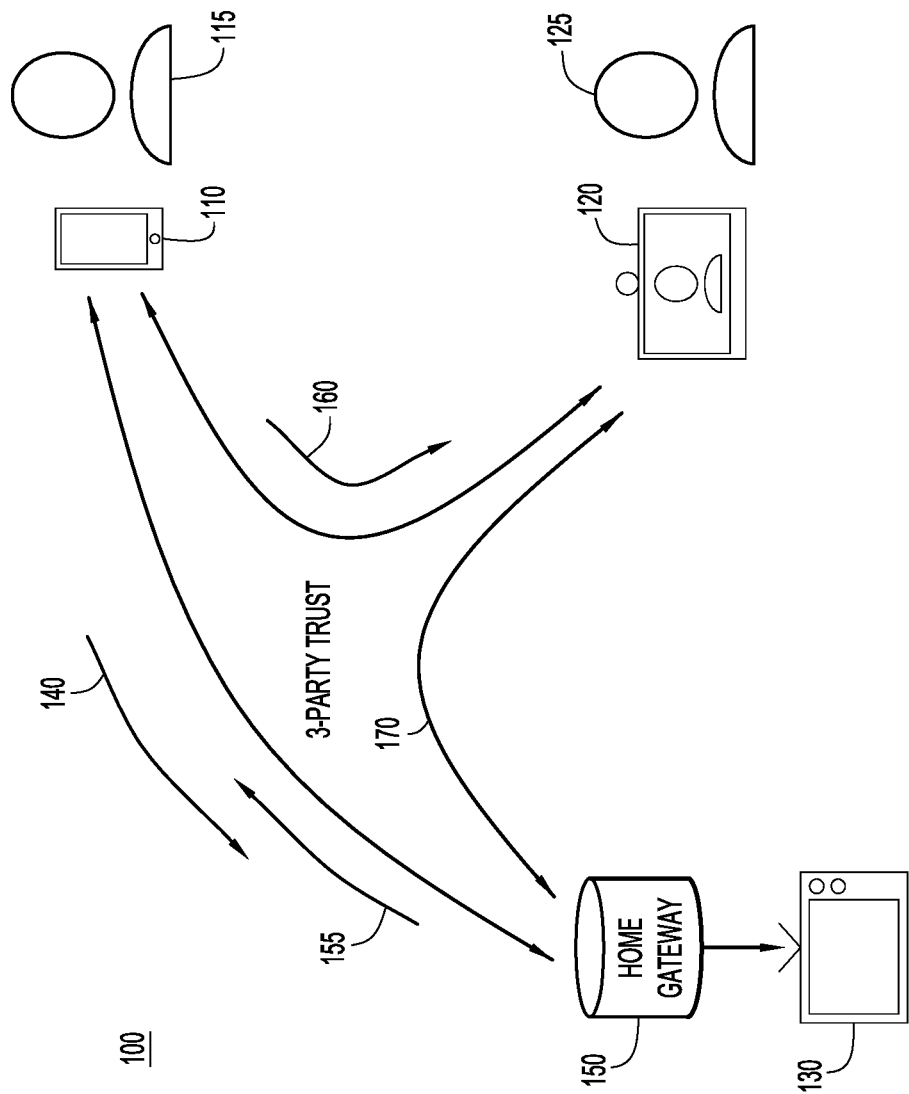
FIG. 1 is an illustration of a first network environment configured to create three-party trust relationships, according to an example embodiment.

Depicted in FIG. 1 is a system 100 that may be leveraged to establish a three-party trust relationship to provide secure access to an Internet of Things (IoT) device from an outside agent (e.g., a call center agent) based upon a trust relationship between the IoT device and a user of the IoT device. For example, a call or contact center agent may be provided access to an IoT device based upon a trust relationship that the IoT device establishes with a caller to the contact center, outside of the call itself. System 100 provides mechanisms to create, manage and tear down these secure three-party trust relationship sessions.

Illustrated in FIG. 1 are a user device 110, a contact center device 120, such as a computer or console in a technical help call center, and a third device 130, such as an IoT device. A user 115, who may be the owner of third device 130, utilizes user device 110 to enter into a conversation with a contact center agent 125 who is using the contact center device 120 to, for example, receive some type of service related to the third device 130. Contact center agent 125 may be a human user, a form of artificial intelligence, or a computer program, among others. While contact center device 120 is illustrated in FIG. 1 as part of a call center operation, the techniques described herein may be applied to any form of collaborative remote access, including telemarketing, help desks, remote diagnostics, healthcare, training, and collaborating with family and friends via networks of devices, among others. Furthermore, while contact center device 120 is illustrated as being under the control of agent 125, contact center device 120 may not necessarily be manned by a human. Contact center device 120 may be a fully automated system and/or be under the control of an additional expert system or a synthetic avatar. A "network connected device" is any IoT device.

According to the example of FIG. 1, contact center device 120 wants access to third device 130 which is under the administrative control of the user 115. Contact center device 120 informs the user 115 about this over a telephone conversation, or through another appropriate interface, such as an email, video conference, instant message or an application specific real-time or non-real-time communication session. In order to facilitate the access of contact center device 120 with third device 130, user device 110 is configured with information that may be used to establish the relationship between the contact center device 120 and device 130 based upon a trust relationship between user device 110 and third device 130. Some of this information might be configured on user device 110 by user 115 just before the trust relationships are established. For example, user device 110 may be preconfigured to establish trust relationships, and user 115 is required to enter a password to complete the information necessary to establish a trust relationship. User 115, through user device 110, sends a request message 140 to the third device 130 (or, according to some embodiments, to gateway device 150 that may act as a proxy for third device 130). Request 140 contains information indicating the duration of access, data specific to access requirements, and a security token generated by the user device 110. Message 140 may also place additional limits on device access, such as resource limits (e.g., how many pages contact center device 120 is allowed to print if third device 130 is a printer, or how much storage may be used, etc.).

Third device 130 verifies the token (multiple mechanisms may be used for the verification, such as a shared key, Public Key Infrastructure (PKI), and others) and grants access to user device 110 through message 155. A data connection is set up between the user device 110 and third device 130. The user device 110 also establishes a data channel with contact center device 120 (e.g., a Web Real-Time Communication (WebRTC) data channel, a Session Initiation Protocol (SIP) data media line, SIP MESSAGE/INFO messages, among others) through message 160. User device 110 then bridges the data connection between user device 110 and third device 130 and the data connection between the user device 110 and the contact center device 120. The user device 110 also informs the contact center device 120 that bridging is complete. More detailed examples of this process are provided below with reference to FIGS. 6-10. In other words, user device 110 provides a "Device Authorization Function." This Device Authorization Function may be embodied in a software module that is located at user device 110, i.e., co-located with the session endpoint of the party that has administrative control of the device, or as will be described below, located in an independent device or located as a cloud service.

With the bridging complete, the communication between contact center device 120 and third device 130 may include the contact center sending device specific messages to user device 110, which serves as a proxy between contact center device 120 and third device 130. Specifically, user device 110 may choose to intercept, validate and modify the messages sent between contact center device 120 and third device 130, thereby acting as a secure gatekeeper.

At any point of time, user device 110 may decide to remove itself from the communications between contact center device 120 and third device 130. According to other examples, user device 110 will serve as a proxy for the communications between contact center 120 and third device 130. User device 110 will establish a new communication session between contact center device 120 and third device 130. Specifically, user device 110 may request that contact center device 120 and third device 130 continue communication over the new direct connection 170. In order to facilitate the new connection 170, a reference to the initial session (i.e., the session in which user device 110 served as a proxy) would be sent in the signaling to both contact center device 120 and third device 130. The duration of direct connection 170 between contact center device 120 and the third device 130 (and/or gateway device 150) is independent of the duration of the communication session between contact center device 120 and user device 110. However, contact center device 120 or user device 110 may choose to limit the duration of direct connection 170 between contact center device 120 and the third device 130 (and/or gateway device 150) to that of the duration of the communication session between contact center device 120 and user device 110 by initiating an explicit termination of the direct connection 170 between contact center device 120 and the third device 130 (and/or gateway device 150). To address the possibility where the user device 110 may inadvertently lose its connection to third device 130 (for example, a cell phone drop), user device 110 may include a timeout procedure in its communication with third device 130. In the event user device 110 fails to provide third device 130 with a refresh request within the timeout period, third device 130 will tear down connection 170 with the contact center device 120.

In order to establish a direct connection between contact center device 120 and third device 130, user device 110 will send details of the access that contact center device 120 should give to third device 130, such as a security token, the duration of access (i.e., the length of time during which access will be authorized) and information specific to access. User device 110 then contacts the third device 130 directly and requests a communication with contact center device 120. The request includes the token from contact center device 120. The user device 110 provides credentials for the token. Third device 130, after validating the request from user device 110, grants access to user device 110, and includes information for establishing the communication session with contact center device 120, including a duration for the communication session (i.e., the length of time during which communication will be authorized), operations supported by third device 130, details required for external communication to third device 130, as well as the token for the communication session between third device 130 and contact center device 120. User device 110 passes this information to contact center device 120, which allows contact center device 120 to establish a communication session directly with third device 130 using a token The token may have been generated by user device 110, and subsequently sent to contact center device 120 and third device 130. According to other examples, user device 110 requests a token from contact center device 120, passes the token to third device 130 after signing the token with its own certificate. According to either example, user device 110 will typically obtain the token from third device 130 and pass it on to contact center device 120.

Third device 130 validates the token and responds to contact center device 120 with its own token, which is validated in turn by contact center device 120, thereby establishing the direct connection. Once the direct connection is established, third device 130 and contact center device 120 separately signal details of the new session to user device 110. User device 110 may also initiate a subscription to third device 130 and/or contact center device 120 so that it may receive updates on events on the session occurring between third device 130 and contact center device 120, or user device 110 may completely remove itself from the communications between contact center device 120 and third device 130.

Any of the parties involved in the session can tear down the session either when the duration expires or when it decides that it does not want to participate in the session any longer. The termination is signaled to the other parties explicitly, or through a "keep-alive" message with a timeout mechanism that may be sent by any of the parties.

For ease of deployment of the techniques described herein, standard interfaces may be implemented for communication between the different entities. Furthermore, the devices at a certain location may be proxied by gateway device 150 and either the device or the proxy device will implement device interfaces. These interfaces may include software applications that are distributed by the device manufacturers, downloaded from "app stores" and/or standard interfaces that devices are configured to leverage.

In example embodiments that include gateway device 150, gateway 150 provides access between third device 130 and contact center device 120, and integrates the access with multimedia sessions. Gateway device 150 may allow multiple agents (e.g., contact centers) to communicate with the same device at the same time or at different times, and may implement logic to coordinate access from multiple agents. Gateway device 150 may also provide services to a plurality of third devices 130. When multiple third devices are present, contact center device 120 can communicate using a single protocol and/or interface with gateway device 150, with gateway device 150 translating to the different protocols and utilizing the different interfaces that connect with the plurality of third device 130.

Gateway device 150 may support a plurality of device control protocols (e.g., Message Queue Telemetry Transport (MQTT), Extensible Messaging and Presence Protocol (XMPP), Universal Plug and Play (UPnP), etc.) and access mechanisms (Bluetooth® wireless technology, Zigbee, Wi-Fi® wireless technology, etc.). Furthermore, gateway device 150 may utilize a meta-protocol that can be carried across any of these access mechanisms. If third device 130 is to be accessed by contact center device 120, third device 130 may implement this meta-protocol to expose data and/or services to contact center device 120. Alternatively, gateway device 150 may translate the meta-protocol signaling that it receives from user device 110 and contact center device 120 to the protocol specific to third device 130. Similarly, gateway device 150 may receive messages from a plurality of devices over a plurality of protocols, and translate them all to the meta-protocol for communication with user device 110 and contact center device 120. Accordingly, multiple devices, each operating under different protocols may communicate with user device 110 and contact center device 120 through gateway 150, regardless of whether user device 110 and contact center device 120 are configured to communicate using the third device specific protocol.

Gateway device 150 may also perform filtering, aggregation, analytics, or other mathematical and/or statistical functions on the data that it receives from third device 130, user device 110 and/or contact center device 120, regardless of whether the gateway device 150 is aware of the underlying meaning of the data. Gateway device 150 may also implement specific operations that cater to specific device requirements (buffering, compression, burst transmission etc.).

In addition to facilitating the communication sessions between third device 130 and one or more of user devices 110 and/or contact center device 120, gateway device 150 may be queried by user device 110 for details of active communication sessions. Specifically, gateway device 150 may function to manage all communication sessions between one or more third devices 130. Furthermore, gateway device 150 may be co-located with a communication gateway. In this form, gateway device 150 will allow the session between contact center device 120 and user device 110 to be proxied through it. Additionally, gateway device 150 may be co-located with a session endpoint, such as user device 110 or contact center device 120, or may be co-located in the same device as third device 130. For example, gateway device 150 may be a stand-alone hardware box, or integrated with another network element (for example a broadband access modem, wireless access point, router, or firewall), or could be virtualized into any computationally capable endpoint or cloud server.

Figure 2:
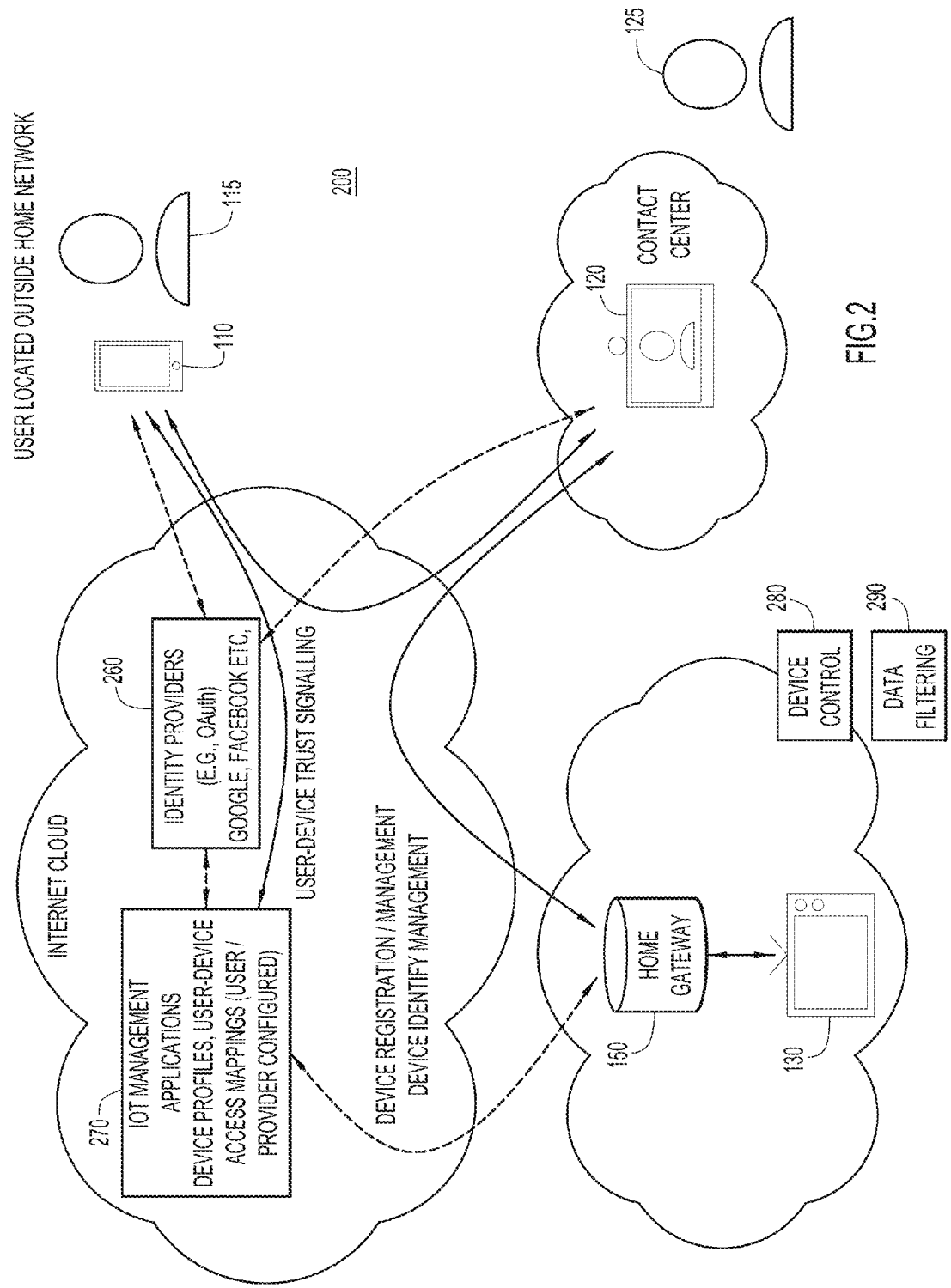
FIG. 2 is an illustration of a second network environment configured to create three-party trust relationships, according to an example embodiment.

With reference now made to FIG. 2, depicted therein is an example network environment 200 in which device registration and identity management functions depicted at reference numeral 260 and session control, authentication/authorization, device management functions at 270 are also run on the cloud, while lower layer device control functions 280 and data filtering functions 290 are performed at the premises where third device 130 resides. By basing high-level control functions such as identity management functions 260 and device management functions 270 in the cloud, a centralized authority can be provided for both identity and management. The cloud allows the high-level control functions to access the extensive computational and storage capacity of the cloud, allowing the techniques discussed herein to be applied in large-scale deployments.

With reference now made to FIG. 3, depicted therein is another example network environment 300, in which the three-party trust relationship is established through the use of short messaging service (SMS) messages. Specifically, message 140 (from FIG. 1) is sent as an SMS message over network 360. Network 360 may be embodied as a telephony network, or any other network capable of SMS message transport. Included in message 140 is a one-time-password (OTP) which serves to authenticate user device 110 with third device 130 and/or gateway 150. The telephone number of user device 110 may also be used with the OTP to authenticate user device 110. Telephony network server 370 serves to transmit message 140 from user device 110 to device 130 and/or gateway 150, and in the opposite direction as well. Once authenticated, user device 110, third device 110 (or gateway 150) and contact center device 120 will communicate as described above with reference to FIG. 1.

With reference now made to FIG. 4A, depicted therein is a flowchart 400 depicting a process for providing a three-party trust relationship in accordance with the network environments illustrated in FIGS. 1-3. At 410, a trust relationship is established between a first network connected device and a second network connected device. As used herein, "network connected device" refers to a device that communicates over a network with another device through an authenticated communication session. According to the example of FIG. 1, this trust relationship may be the relationship between the user device 110 and the contact center device 120.

In 420, a communication session is established between the first network connected device and a third network connected device, wherein the third network connected device lacks a trust relationship with the second network connected device. Once again using the example of network environment 100 of FIG. 1, establishment of the communication session between the first network connected device and third network connected device may involve the sending of the message 140 from user device 110 to third device 130 in order to establish the communication session between user device 110 and third device 130. The establishment of the communication session may also involve the sending a message from user device 110 to gateway device 150.

In 430, a message is sent from the first network connected device to establish a communication sessions between the third network connected device and the second network connected device based on the trust relationship between the first network connected device and the second network connected device. Within the context of the example of FIG. 1, the establishment of the communication session between the third network connected device and the second network connected device may include the bridging of the communication session between the user device 110 and the third device 130 with the communication session between the user device 110 and the contact center device 120. According to other examples, the message sent in 430 may comprise the sending of a token to the contact center device 120 that allows contact center device 120 to establish a communication session directly with third device 130.

Figure 4B:
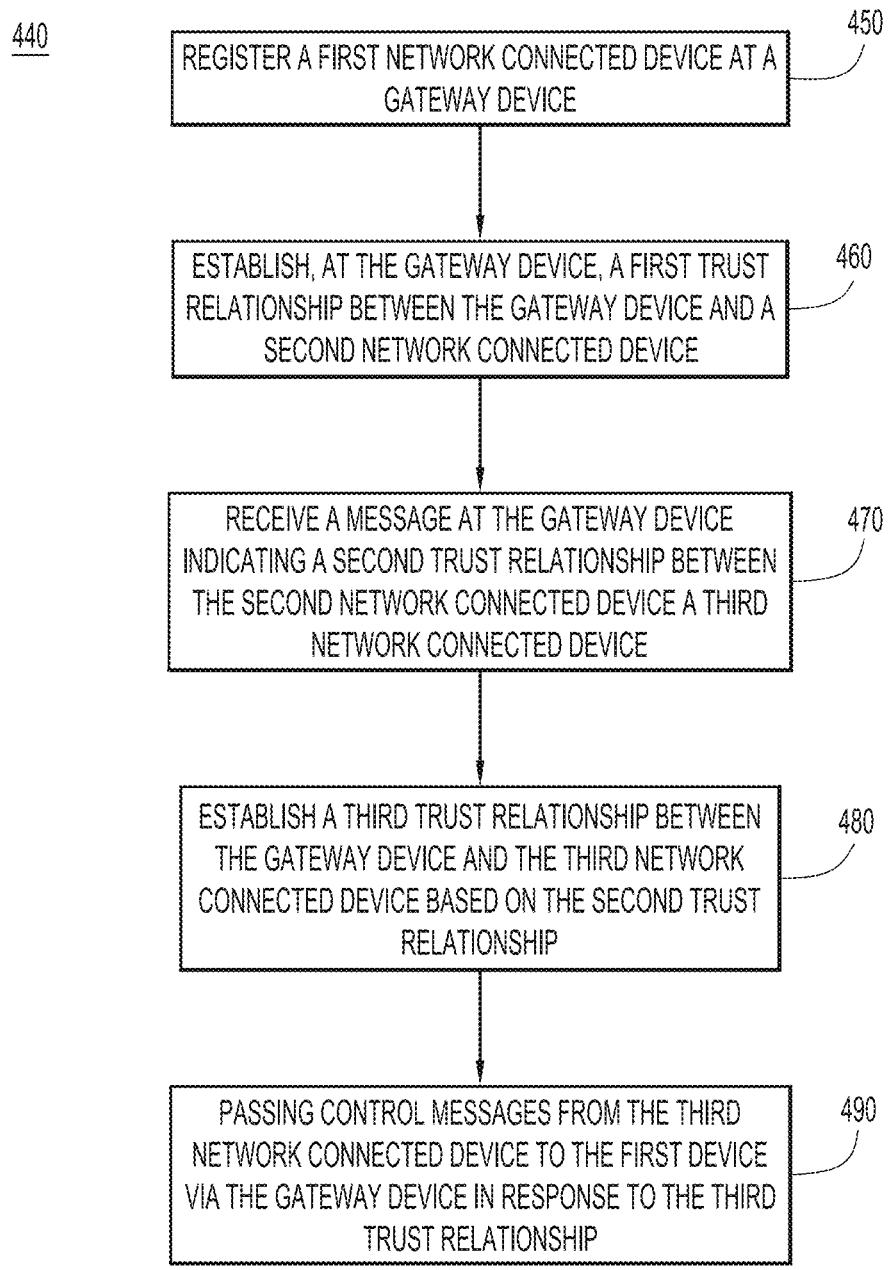
FIG. 4B is a flowchart illustrating a process for creating three-party trust relationships through the use of a gateway device.

The process of FIG. 4A (as well as the system of FIGS. 1-3, and FIG. 4B to be described in detail below) may be utilized to solve numerous issues that involve the need for trust relationships between three or more parties, including:

1. Scenarios involving an agent needing to provide a printed document to a caller. Absent the process of FIG. 4A, the agent may send the document to the caller by email and expect the caller to print it later. If the agent can print the document directly to a caller printer, the contact center experience is enhanced. The ability of a contact center agent to directly access a user's printer may be critical in cases where the contact center wants to ensure that there is only a single printed copy of a certain document corresponding to the session/user (for example, printing event tickets).
2. Scenarios in which a caller to a contact center would like to send image data from a device (e.g., camera, scanner etc.) that is not involved in the call to, for example, assist in trouble shooting a device.
3. Scenarios in which a caller to a contact center may want to establish a session with the contact center for directly troubleshooting an electronic device. The process of FIG. 2 allows the user to create a secure session between the device and the contact center for remote monitoring and troubleshooting, regardless of whether the duration of the troubleshooting will exceed the duration of the caller's session with the contact center agent, and regardless of whether the user is located with and/or has physical access to the electronic device.
4. Scenarios involving patient monitoring systems or geriatric care systems which authorize the monitoring systems to automatically initiate a notification to a contact center if any of the vital parameters from a range of sensors meet or exceed (or go below) a threshold. These sensors may be measuring ambient conditions, data from a patient's bed or from other diagnostic devices. Once the notification is made, the contact center may call into the client's premises where the call is authorized and connected to the patient's bed and camera/microphone system for remote monitoring (with or without explicit consent from a person that is responsible for the patient).
5. Scenarios which allow a Telepresence endpoint/kiosk to provide banking services to passers-by. The user can access services from multiple banks using the kiosk. The bank that controls the kiosk addresses money dispensing and other last-mile tasks while the user connects to the contact center of the bank with whom he deals.
6. Scenarios that involve citizens observing suspicious activity, for example, a mall parking lot, in order to call a police contact center to report the activity. The contact center maintains the session with the citizen to obtain additional information. At the same time, the contact center obtains access to surveillance cameras belonging to the mall (a mandatory service as part of the emergency call) and starts a monitoring session. The feed from the surveillance cameras may or may not be shown to the caller depending on the conversation between the contact center agent and the caller.

With reference now made to FIG. 4B, depicted therein is a flowchart depicting a process 440 for providing a three-party trust relationship through the use of a gateway device. At 450, a first network connected device, such as an Internet of Things device, is registered at a gateway device. This registration of the first network connected device will allow the gateway device to proxy or monitor access and control to the of the first network connected device by outside devices, such as a user device or a contact center device.

In 460, a trust relationship is established between the gateway device and a second network device. The second network connected device may be a user device, such as device 110 from FIGS. 1-3 above. In 470, the gateway device receives a message that indicates that the second network connected device has established a second trust relationship. The second trust relationship is a trust relationship between the second network connected device and a third network connected device. The third network connected device may comprise a contact center device, such as contact center device 120 from FIGS. 1-3 above.

In 480, a third trust relationship is established between the gateway device and the third network connected device. This third trust relationship is established based on the second trust relationship indicated in the message received in 470. In other words, the gateway device enters into the trust relationship with the third network connected device based on the third network connected device having previously established a trust relationship with the second network connected device.

In 490, control messages are passed from the third network connected device to the first network connected device via the gateway device based on a trust relationship having been established between the gateway device and the third network connected device. The passing of the control messages may include passive passing of the messages, monitoring of the messages, and/or translation of the messages from a message format or protocol supported by the third network connected device to a format or protocol supported by the first network connected device.

With reference now made to FIG. 5, depicted therein is a data flow 500 of the interconnections between the elements of system like those of FIGS. 1-3. Specifically, the device authorization function 560 and the device security proxy function 570 may be centrally located, meaning they are functions which serve to bridge the communications between user device 110, contact center device 120 and third device 130.

In order to strike a balance between privacy requirements of the user and convenience, device security proxy function 570 may implement hierarchical access levels, examples of which are illustrated in Table 1 below. According to one example, a user may ensure that substantially all requests to access an in-home camera that come from identities other than the user's spouse or security provider are to be summarily rejected, and the user may further ensure that requests from the user's security provider are to be specifically authenticated by the user. This will allow the user to safely provide access to specific users, request to be notified for manual access grant in some cases, and reject intrusive requests without access in other cases. Accordingly, the user may apply a "Restricted" level of security to indoor camera devices. An example of the use security levels like those illustrated in Table 1 is described with reference to FIG. 9 below.

TABLE 1

| Level | Entity | Example Devices |
| --- | --- | --- |
| Public | Entire Internet | Weather sensors |
| Social | Social media friends list | Outdoor camera, telephone, vehicle/phone location |
| Limited | Existing business relationship | PC and peripherals, media devices, vehicles, energy meters etc. |
| Restricted | Family, doctor, accountant etc. | Storage archives, indoor cameras, door locks etc. |
| Private | Only the individual | Healthcare devices, wall safe door |

Figure 6:
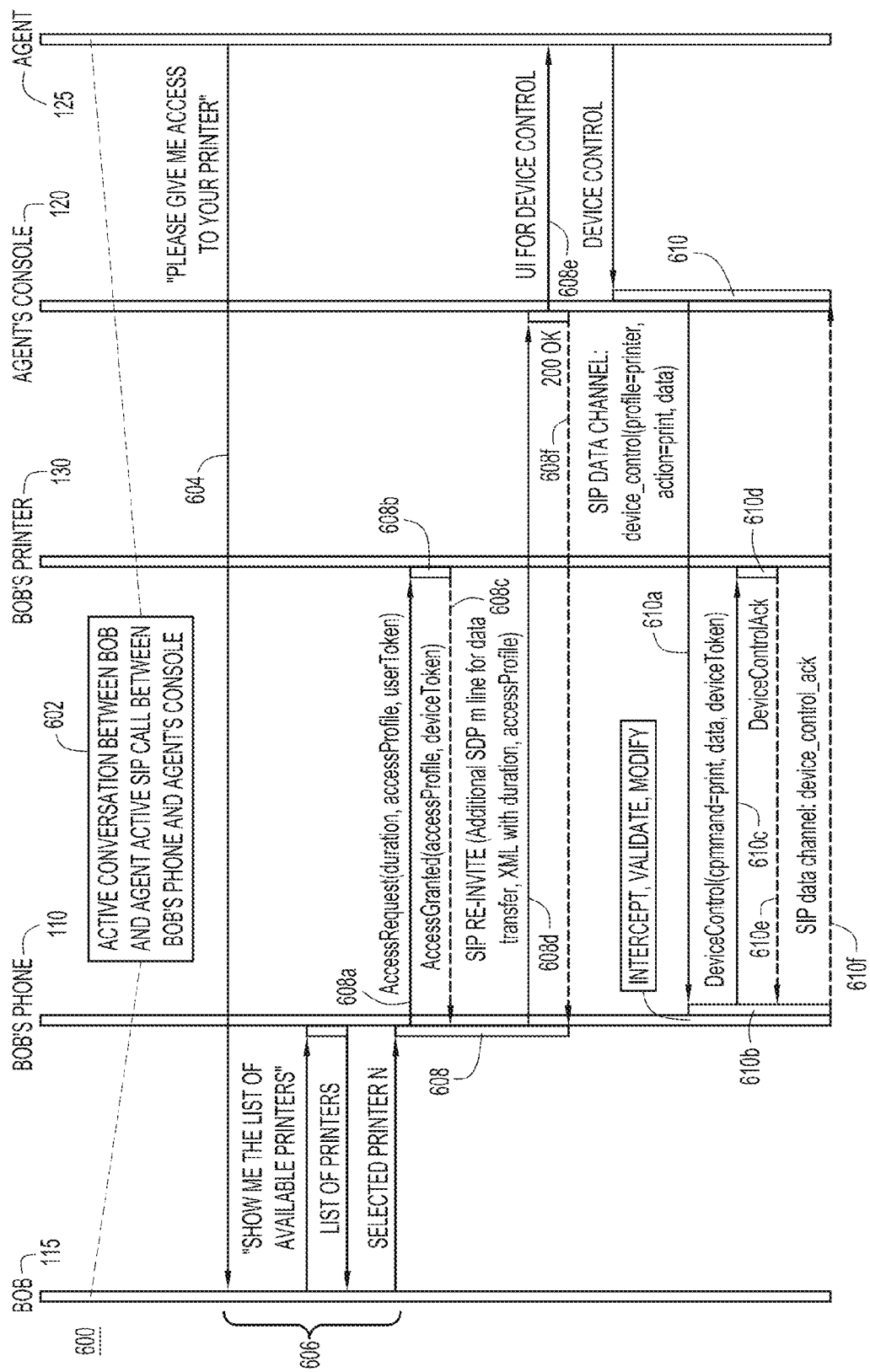
FIG. 6 is a first sequence diagram illustrating the flow of messages used to create a three-party trust relationship between a user device, an Internet of Things device, and a contact center device, according to an example embodiment.

With reference now made to FIG. 6, depicted therein is sequence diagram for a process 600 involving interactions and messages between a user 115, a user device 110, a contact center device 120, a contact center agent 125 and a third device 130, such as an IoT device. The messages sent in the flows depicted in process 600 are used to facilitate secure access to the third device 130 for the contact center device 120 based on the trust relationship between user device 110 and third device 130. The specific example of FIG. 6 is one in which user device 110 acts as a proxy for the communication between contact center device 120 and third device 130.

The call flow of process 600 utilizes the Session Initiation Protocol (SIP) for some of the messages illustrated therein. However, the processes illustrated in FIG. 6 (as well as the examples illustrated in FIGS. 7-10) may implement any session protocol that lends itself to the message exchanges shown herein. The examples also utilize a token access mechanism, though other means of establishing trust between the endpoints may be used. In cases where a simple token exchange does not provide sufficient security, a challenge protocol may be employed where the device requests a password, or contacts an external identity provider (e.g., email services, social networks, etc.) for authentication. An extensible mark-up language (XML) based data format is also used in the examples, but XML is not required to implement the example embodiments.

In the example of FIG. 6, Bob, i.e., user 115, is participating in a telephone call 602 with a call or contact center agent 125. Bob is using a user device 110, in this case a smartphone, while agent 125 is utilizing contact center console 120. During the telephone call, agent 125 requests access to a third device 130, which in the present example is Bob's printer. The request is, for example, a verbal request relayed to Bob through messages 604 sent through telephone call 602. Through exchange 606, Bob accesses a list of printers with which he has a trust relationship, and selects printer 130.

Once printer 130 is located, Bob initiates validation procedure 608 to establish a communication session between his phone 110 and the printer 130. Message 608*a* is a message requesting a communication session with printer 130, and included in it are an indication of the requested duration for the communication session, an access profile, and a user security token. Printer 130 performs a validation procedure 608*b* on the user token provided in message 608*a* and replies with message 608*c* which indicates that Bob's phone 110 has been granted access to printer 130. Included in message 608*c* are an access profile and a device security token. With access granted, message 608*d* is sent to agent console 120 which provides information that will allow agent console 120 to control printer 130. For example, message 608*d* may be a SIP message indicating that a communication session has been established with printer 130. Included in message 608*d* is a request for an additional Session Description Protocol (SDP) media line to facilitate data transfer between phone 110 and console 120, an XML file that includes a duration for the communications to take place with console 120, and an access profile. An indication that communication is established with printer 130 is provided to agent 125 through message 608*e*, which is communicated to agent 125 through the user interface of console 120. Finally, console 120 replies to phone 110 with "OK" message 608*f*.

Agent 125 then seeks to control printer 130 through remote device control process 610. Console 120 sends message 610*a* to smartphone 110 over the SDP media line established by message 608*d*. Smartphone 110 carries out a proxy procedure 610*b* to intercept, validate and modify the messages provided by console 120. Smartphone 110 sends message 610*c* to printer 130 which includes the data that console 120 would like printer 130 to print, and printer 130 prints the data through process 610*d*. Printer 610*e* acknowledges that the printing procedure has been carried out through message 610*e* sent to smartphone 110, and the smartphone 110 forwards this message to console 120 through message 610*f*. In other words, smartphone 110 allows contact center 120 to control printer 130 based on the trust relationship between smartphone 110 and printer 130.

Figure 7:
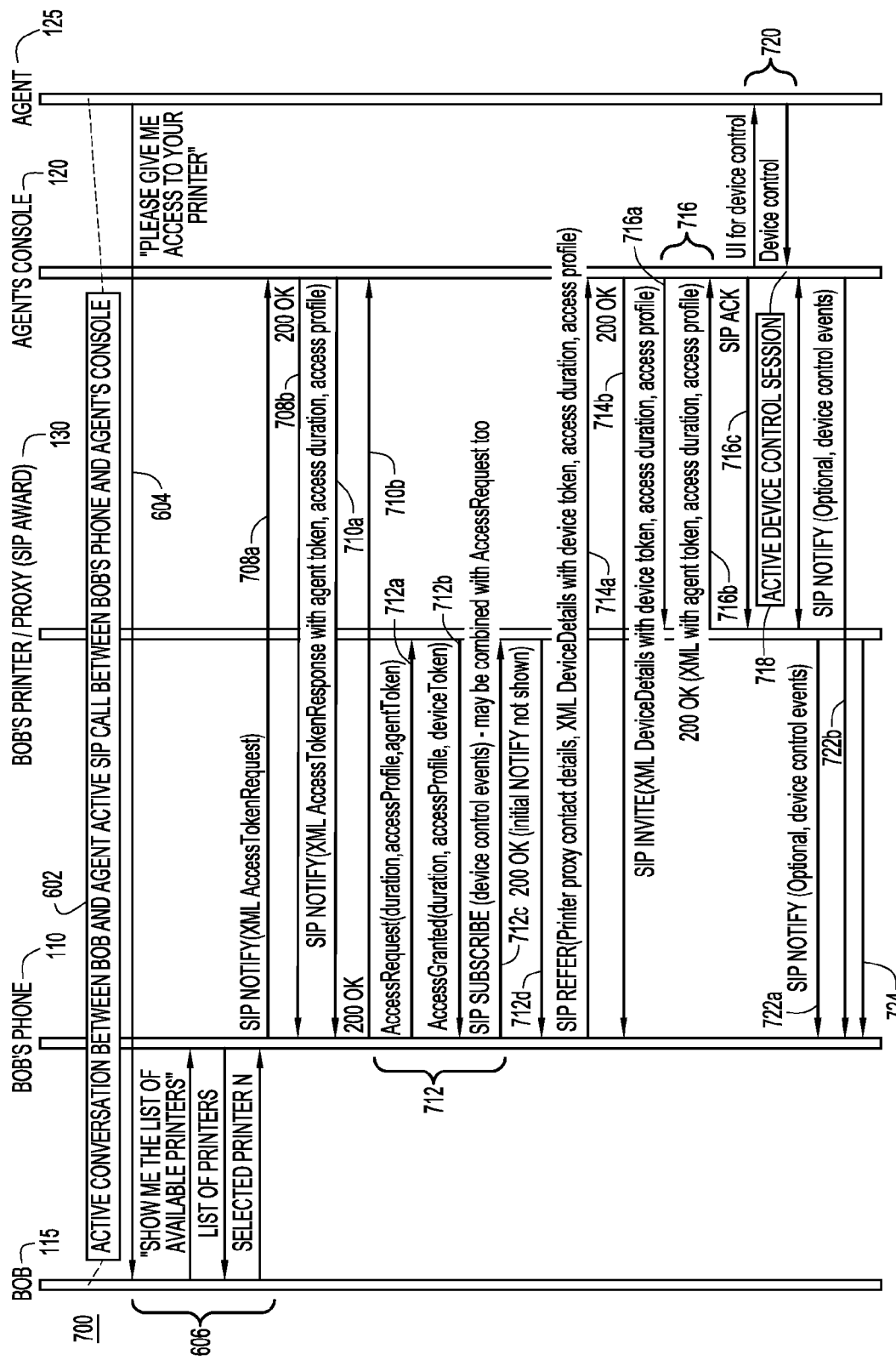
FIG. 7 is a sequence diagram illustrating the flow of messages used to create a three-party trust relationship between a user device, an Internet of Things device, and a contact center device, according to an example embodiment.

With reference now made to FIG. 7, depicted therein is a sequence diagram of a process 700 by which user device 110 facilitates the creation of a direct communication session between contact center device 120 and third device 130 based on a trust relationship between user device 110 and third device 130. Process 700 begins like that of process 600 of FIG. 6 with user Bob 115, participating in a telephone call 602 with contact center agent 125. As with process 600 of FIG. 6, agent 125 requests access to Bob's printer 130 through messages 604 sent through telephone conversation 602. Through exchange 606, Bob accesses a list of printers with which he has a trust relationship, and selects printer 130. Process 700 differs from that of process 600 from FIG. 6 when smartphone 110 sends message 708*a*. According to the example of FIG. 7, smartphone 110 will not serve as a proxy for the communications between agent console 120 and printer 130. Instead, smartphone 110 will facilitate the establishment of direct communication between agent console 120 and printer 130 based on a trust relationship that smartphone 110 shares with each of these devices. Accordingly, smartphone 110 sends message 708*a* which is an SIP notification message, and more specifically, a SIP token request. In other words, SIP message 708*a* is a request to agent console 120 for agent console to provide smartphone 110 with a security token so that smartphone 110 can establish a trust relationship with agent console 120. Agent console acknowledges SIP request 708*a* through message 708*b*, and subsequently sends SIP message 710*a* which includes an XML token request response, an agent security token, an indication of the duration of access to printer 130, and an access profile. Smartphone 110 acknowledges receipt of message 710*a* through message 710*b*.

Smartphone 110 then begins a process 712 to establish a trust relationship between phone 110 and printer 130. Process 712 begins with message 712*a* which is an access request sent to printer 130. Included in the access request 712*a* are an indication of the duration of the access, an access profile, and the agent token received from agent console 120. Access request 712*a* is granted by printer 130 through access grant message 712*b*, which includes a device token along with an indication of the duration of the access and the access profile. Smartphone 110 then replies with SIP subscribe message 712*c* which includes the events that will seek to be controlled through the access, and printer 130 replies with message 712*d*. While illustrated as separate messages, messages 712*a* and 712*c* maybe combined into a single message, as may include responses 712*b* and 712*d*.

Having established a relationship with both agent console 120 and printer 130, smartphone 110 sends SIP refer message 714*a* to agent console 120. Contained in SIP refer message 714*a* are the device token received by phone 110 through message 712*b*, an XML file containing device details for accessing printer 130, the indication of the duration of the access, and the access profile. Agent console 120 acknowledges message 714*a* through message 714*b*, and begins process 716 of establishing a connection with printer 130. Specifically, SIP message 716*a* is sent from agent console 120 to printer 130. Included in message 716*a* are the device token initially sent to smartphone 110 in message 712*b*. This allows printer 130 to authenticate agent console 120. Message 716*a* also includes device details, an indication of the duration of the access and the access profile. Printer 130 responds back with message 716*b* which includes the agent token it received through message 712*a*, the access duration and the access profile, which agent console acknowledges through message 716*c*. Accordingly, using the tokens which were initially exchanged based on a trust relationship with smartphone 110, a direct connection is established between printer 130 and contact center device 120. This enables establishment of an active device control channel 718 between agent console 120 and printer 130.

With active device control channel 718 established, agent console 120 sends commands to printer 130. For example, agent 125 may send print commands 720 through the user interface of agent console 120. Printer 130 and agent console 120 may also notify smartphone 110 of the types of control performed through device control channel 718 through SIP notification messages 722*a* and 722*b*, respectively. Furthermore, phone 110 may monitor the communications between agent console 120 and printer 130 in order to provide an auditing function. Phone 110 may monitor the communications in order to detect evidence of hacking, forged tokens, signs of attacks and/or other possibly malicious actions on the part of agent console 120. If any of these actions are detected, phone 110 may respond by tearing down the communication session between printer 130 and agent console 120.

Once agent console 120 has completed accessing printer 130, control channel 718 will be torn down. As a final step, printer 130 may send statistical reports to phone 110 through message 724. For example, the statistical reports may indicate the number of pages printed by printer 130 for console 120.

Figure 8:
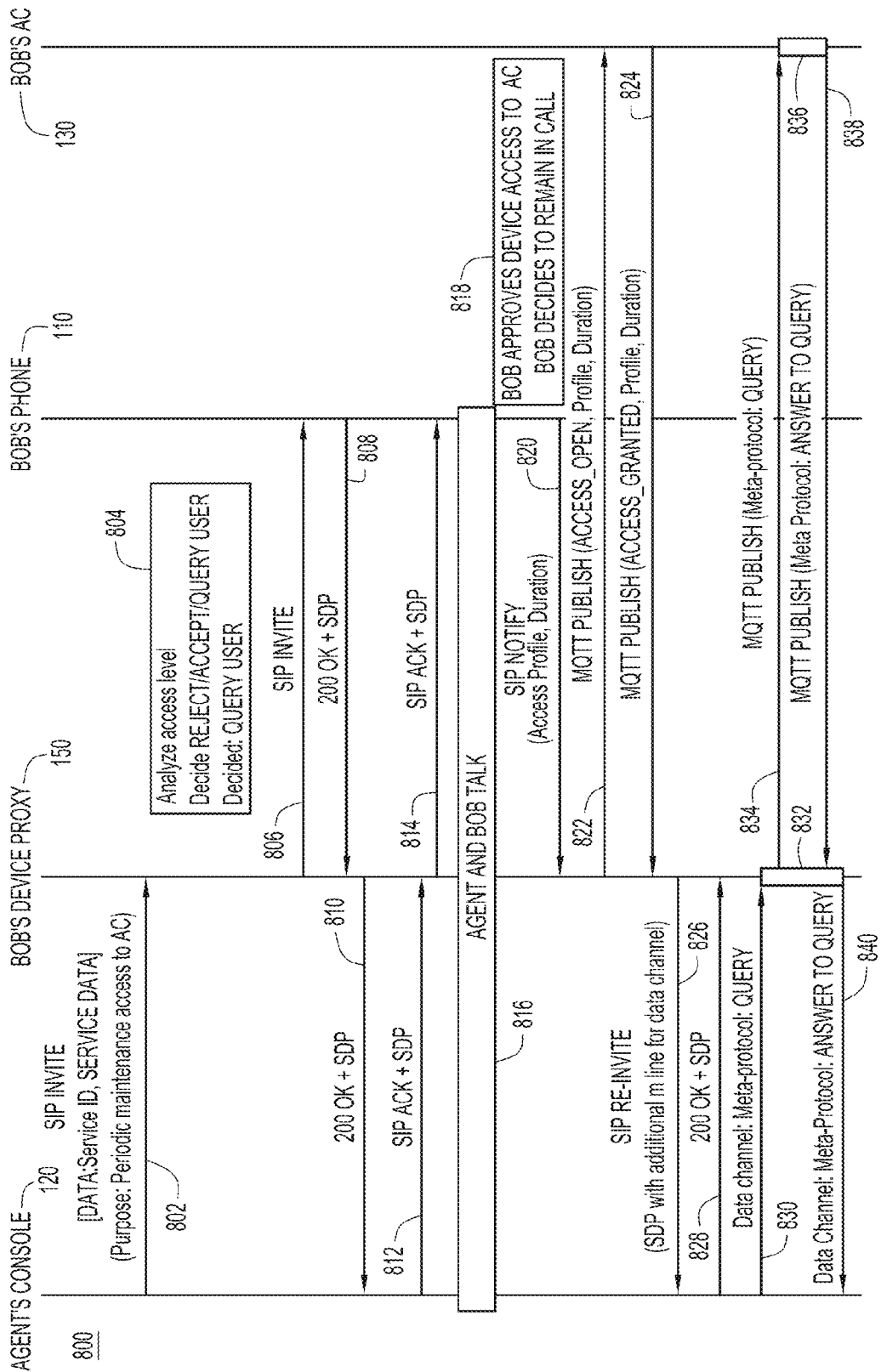
FIG. 8 is a sequence diagram illustrating the flow of messages used to create a three-party trust relationship between a user device, an Internet of Things device, and a contact center device through a gateway device, according to an example embodiment.

With reference now made to FIG. 8, depicted therein is sequence diagram for a process 800 that utilizes a gateway device 150, and where the contact center device 120 seeks access to user device 130, in this case an air conditioning unit, in order to provide periodic monitoring and maintenance for the air conditioner 130. Process 800 begins with contact center device 120 sending SIP invite message 802 to gateway device 150. In 804, gateway device 150 analyzes message 802 to determine how to respond. For example, gateway device 150 may determine a level of security to apply, such as the levels of security included in Table 1 above. Specifically, gateway device 150 determines that a user needs to be queried to determine if access to air conditioner 130 will be granted to contact center 120.

In response to the determination that the user should be queried, gateway device 150 forwards the SIP invite message 802 to user device 110, which in this example is a smartphone, through message 806. Gateway device 150 serves as a proxy to establish a communication session between smartphone 110 and contact center device 120, forwarding reply message 808 to the contact center device 120 through message 810. Contact center device 120 acknowledges message 810 through message 812, which gateway device 150 forwards to smartphone 110 through message 814. Through the communication session established between contact center device 120 and smartphone 110, the contact center agent and the user converse at 816.

Based on the conversation, the user determines in 818 that access should be granted for contact center device 120 to access air conditioner 130. Accordingly, the user causes message 820 to be sent to gateway device 150. Message 820 is a SIP notify message and includes an access profile and an indication of the duration of the access to be provided to contact center device 120. Upon receipt of message 820, gateway device 150 communicates with air conditioner 130 to establish a communication through which access will be provided to contact center device 120. Specifically, gateway device 150 sends MQTT message 822 to air conditioning unit 130. MQTT is a "lightweight" protocol that Internet of Things devices, such as air conditioning unit 130, can be configured to communicate with using minimal resources. MQTT message 822 includes the access profile and access duration that smartphone 110 communicated to gateway device 150 through message 820. Air conditioning device 130 replies with message 824.

Having established a communication session with air conditioning device 130, gateway device 150 establishes a communication session with contact center device 120 through SIP re-invite message 826, which forms a media communication line between contact center device 120 and gateway device 150. Contact center device 120 replies with message 828. With the media communication line established, contact center device 120 sends control message 830. Control message 830 may be a meta-protocol message as discussed above with reference to FIGS. 1-3. Gateway device 150 processes meta-protocol message 830 at 832, translating it into MQTT message 834. In response to MQTT message 834, air conditioning unit 130 performs the operations that were requested by contact center device 120 at 836, and replies with MQTT message 838. Gateway device 150 translates MQTT message 838 into meta-protocol message 840, which is forwarded to contact center device 120. Communications analogous to those described through messages and processes 830-840 will continue until the duration for the session expires, or one of the devices tears down the communication session.

Figure 9:
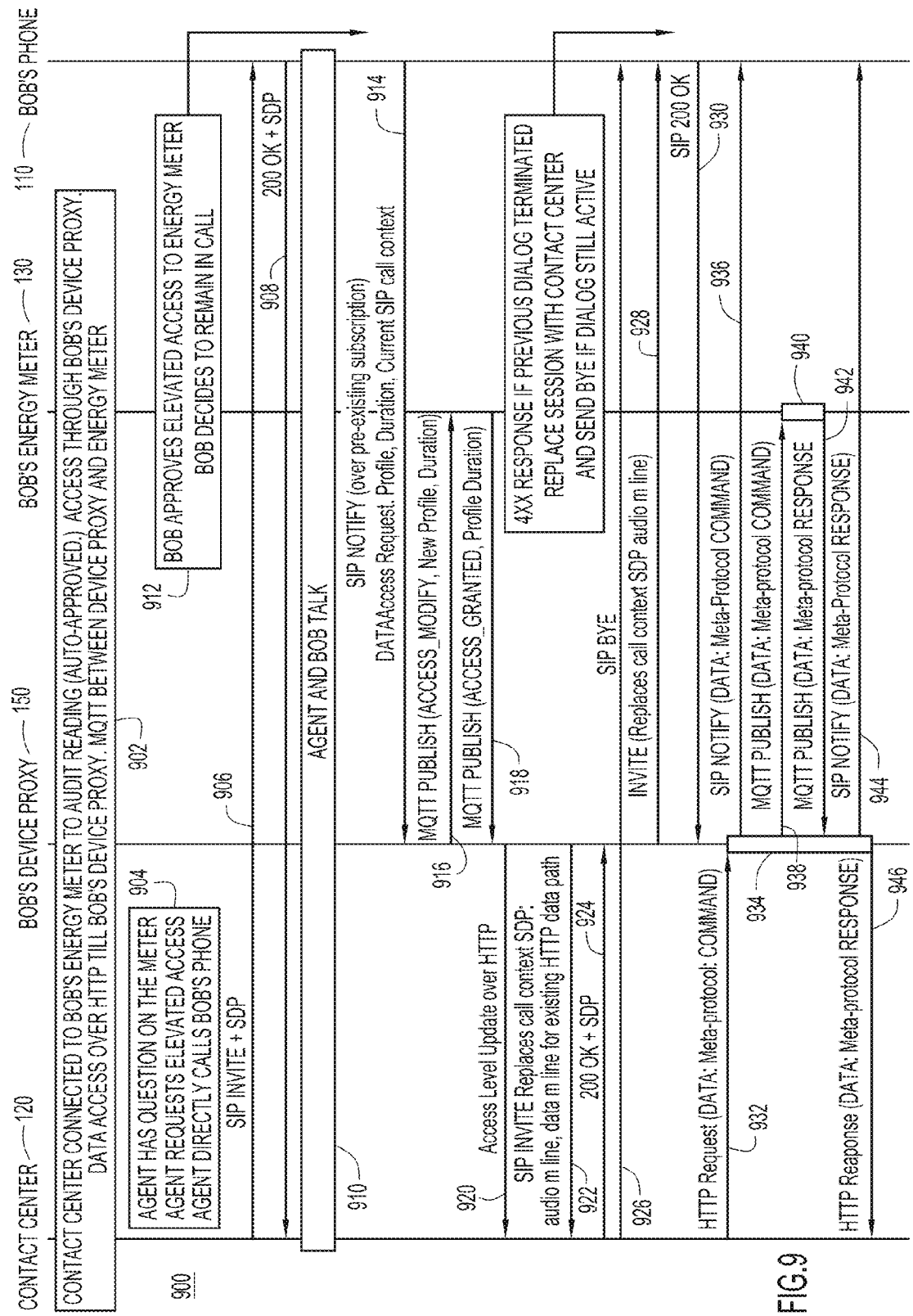
FIG. 9 is a sequence diagram illustrating the flow of messages used to create a three-party trust relationship between a user device, an Internet of Things device, and a contact center device through a gateway device, according to an example embodiment.

With reference now made to FIG. 9, depicted therein is sequence diagram for a process 900 in which a data session 902 has been previously established between contact center device 120 and a third device 130, in this case an energy meter 130. A pre-existing data session, data session 902, is already present between contact center device 120 and energy meter 130 through gateway device 150, and may have been established according to a process like that illustrated in FIG. 8. At 904, a contact center agent determines that there is a reason to have further access to energy meter 130 that is beyond the access afforded by data session 902. Accordingly, the contact center agent has contact center device 120 initiate a communication session with user device 110, in this case a smartphone 110, through messages 906 and 908, thereby establishing a voice conversation 910 between the user and the contact center agent.

During the voice conversation, the user decides to allow the elevated access in 912. Accordingly, the user causes message 914 to be sent to gateway device 150. Message 914 includes a description of the elevated access that is to be provided to contact center device 120. This message is translated to an MQTT message 916 for transmission to energy meter 130, to which energy meter 130 replies with message 918. Gateway device 150 also sends message 920 to contact center device 120 to communicate the elevated access to contact center device 120. In order to replace the previous communication session (data session 902), gateway device 150 also sends a new SIP invite message 922 to contact center device 120, to which contact center replies with message 924. With the elevated access granted, the voice call between the contact center device 120 and smartphone 110 is closed through message 926. If the user indicates that he would like to receive notifications regarding the elevated access, gateway device 150 creates a new data session between gateway device 150 and smartphone 110 through message 928, to which smartphone 110 replies with message 930.

With the elevated access established, contact center device 120 sends control message 932. Control message 932 may be a meta-protocol message as discussed above with reference to FIGS. 1-3. Gateway device 150 processes meta-protocol message 932 at 934. A notification of the contents of meta-protocol message 932 is sent to smartphone 110 through message 936, and an MQTT message 938 is sent to energy meter 130 to have the request carried out. The commands are carried out at 940, and an MQTT response is sent to proxy device 105 through message 942. Gateway device 150 provides a notification to smartphone 110 of the commands carried out at 942 through message 944, and gateway device 150 also sends a response to contact center device 120 through message 946. Communications analogous to those described through messages and processes 932-946 will continue until the duration for the session expires, or one of the devices tears down the communication session.

Figure 10:
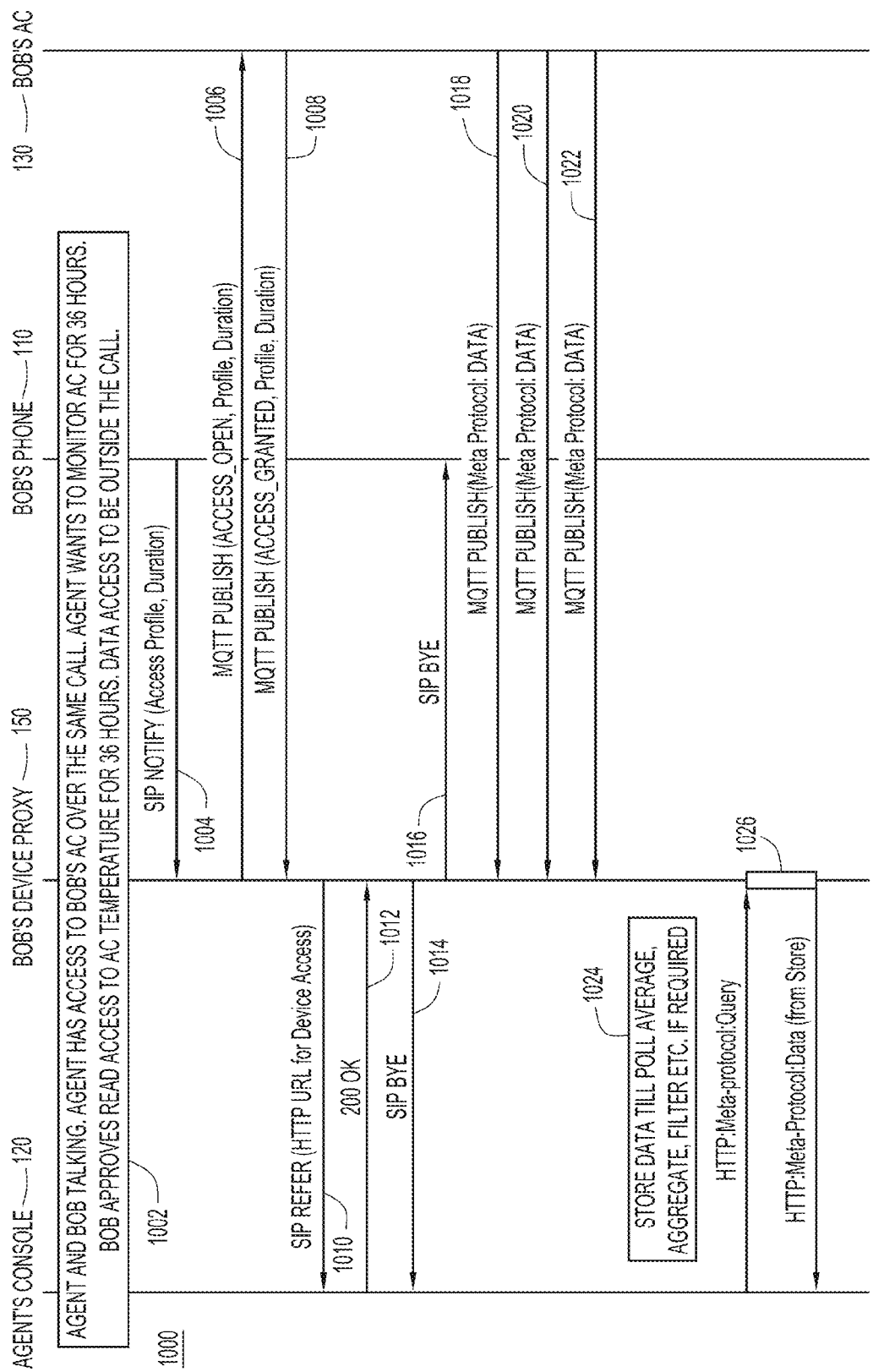
FIG. 10 is a sequence diagram illustrating the flow of messages used to create a three-party trust relationship between a user device, an Internet of Things device, and a contact center device through a gateway device, according to an example embodiment.

With reference now made to FIG. 10, depicted therein is sequence diagram for a process 1000, in which there is an existing voice call 1002 between user smartphone 110 and contact center device 120 during which the contact center device 120 indicates it would like long term access to third device 130, specifically, air conditioning unit 130. Also according to the example of FIG. 10, the access requested by contact center device 120 is for monitoring of air conditioning unit 130 to take place, and the monitored data is to be collected/aggregated and statistically processed and/or filtered by gateway device 150. To establish the long term monitoring, the user causes smartphone 110 to send message 1004 to gateway device 150. Message 1004 is a SIP notify message that includes an access profile and a duration for the access requested by contact center device 120. Upon receipt of message 1004, gateway device 150 sends MQTT message 1006 to air conditioning unit 130 to establish a communication session according to the profile and duration indicated in message 1004. Air conditioning unit 130 responds with MQTT message 1008.

Gateway device 150 also sends SIP refer message 1010 to contact center device 120 to establish a communication session between contact center device 120 and gateway device 150, to which contact center device 120 responds with message 1012. Gateway device 150 also sends the voice call between smartphone 110 and contact center device 120 through SIP bye messages 1014 and 1016.

MQTT messages 1018, 1020 and 1022 are periodically sent to gateway device 150. The data contained in these messages may be stored, aggregated, averaged, monitored for an event-triggering value, filtered and/or otherwise processed by gateway device 150 for subsequent reporting to contact center device 120, as illustrated at 1024. This reporting may take place at set intervals, or as illustrated in FIG. 10, may be in response to a query or command from contact center device 120 or smartphone 110. According to the example of FIG. 10, contact center device 120 sends a Hypertext Transfer Protocol (HTTP) meta-protocol query to gateway device 150. Gateway device 150 executes the query against data aggregated at 1026 and returns the results through HTTP meta-protocol message 1028. As with the examples of FIGS. 8 and 9, communications analogous to those described through messages and processes 1018-1026 will continue until the duration for the session expires, or one of the devices tears down the communication session.

Figure 11:
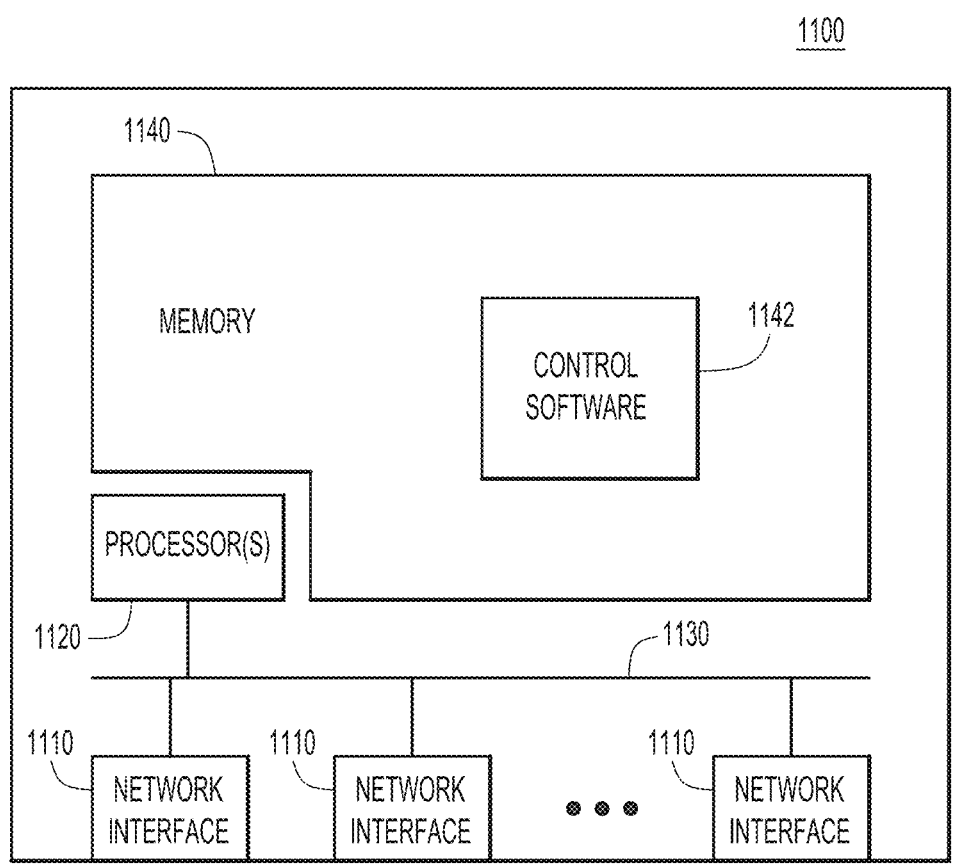
FIG. 11 is a block diagram of a device configured to create three-party trust relationships, according to an example embodiment.

With reference now made to FIG. 11, an example block diagram is shown of a device 1100, and device 1100 may be any one of user device 110, contact center console 120, third device 130, or gateway device 150 of FIG. 1, configured to perform the techniques described herein. Device 1100 includes network interfaces 1110 which may be used to connect to other devices. Accordingly, network interfaces 1110 maybe embodied as wireless communication interfaces, such as those of a smartphone, wireless communication interfaces for communication over a wireless network, Bluetooth interfaces, near field communications interfaces, and/or wired communication interfaces (e.g., Ethernet unit). One or more processors 1120 are provided to coordinate and control device 1100. The processor 1120 is, for example, one or more microprocessors or microcontrollers, and it communicates with the network interfaces 1110 via bus 1130. Memory 1140 stores software instructions 1142 which may be executed by the processor 1120. For example, control software 1142 for device 1100 includes instructions for performing the creation of secure access to devices based on three party trust relationships as described above with reference to FIGS. 1-10. In other words, memory 1140 includes instructions for device 1100 to carry out the operations described above in connection with FIGS. 1-10.

Memory 1140 may include read only memory (ROM), random access memory (RAM), magnetic disk storage media devices, optical storage media devices, flash memory devices, electrical, optical or other physical/tangible (e.g. non-transitory) memory storage devices. Thus, in general, the memory 1140 may be or include one or more tangible (non-transitory) computer readable storage media (e.g., a memory device) encoded with software comprising computer executable instructions. When the instructions of the control software 1142 are executed (by the processor 1120), the processor is operable to perform the operations described herein in connection with FIGS. 1-10.

Figure 12:
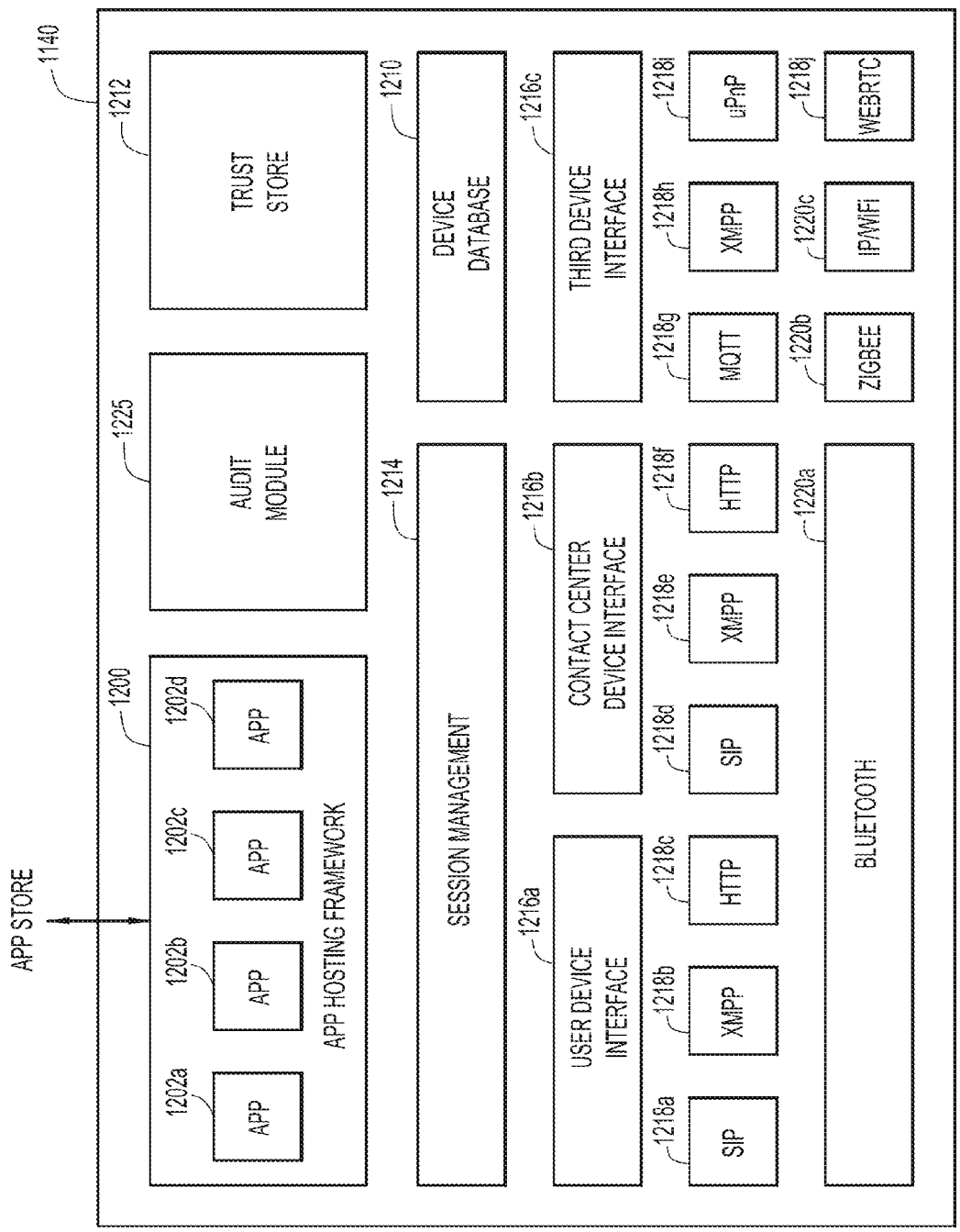
FIG. 12 is a block diagram of the software functional units used by a gateway device to create three-party trust relationships, according to an example embodiment.

With reference now made to FIG. 12, depicted therein is a software architecture diagram of software modules that may reside in the memory 1140 for a proxy device, such as gateway device 150 of FIG. 1, that is configured to provide secure access to devices based on three party trust relationships. Memory 1140 includes application' hosting framework 1200 which executes applications 1202*a-d*. Applications 1202*a-d* provide device specific access to user devices, like third device 130 from FIGS. 1-3. These applications 1202*a-d* may be downloaded from a commercial "app store."

Memory 1140 also includes device database 1210 which stores identifying information for all of the possible user devices (e.g., user device 110 from FIGS. 1-3), IoT devices (e.g., third device 130 from FIGS. 1-3), and external devices (e.g., contact center device 120 from FIGS. 1-3), that the proxy device has or will service. Trust store 1212 includes an indication the level of security for each for the connections between the user devices, IoT devices, and external devices. For example, trust store 1212 may indicate which of the levels of security included in Table 1 above are to be applied to different communication sessions.

Session management software 1214 includes the software instructions necessary to carry out the processes described above with reference to FIGS. 1-3 and 6-10, while device interfaces 1216*a-c* provide specific instructions for communicating with user devices, IoT devices, and external devices, respectively, while protocol definitions 1218*a-j* define the message protocol formats for use by the device interfaces when the proxy device communicates with the user devices, IoT devices, and external devices. Some of the message protocols may be specific to the user device interface and/or the contact center device interface. For example, WEBRTC protocol 1218*j* may not necessarily be used by a third device, such as third device 130 of FIGS. 1-10. External interface protocol modules 1220*a-c* allow the proxy device to communicate according to different communication protocols. Finally, audit module 1225 audits the security and permission status of connections between, for example, devices 110, 120, 130 and 150 of FIGS. 1-10 above. Audit module 1225 determines if any use of any device has exceeded its prescribed time or resource limits. Audit module 1225 also continuously looks for evidence of hacking, forged tokens, distributed denial of service attacks (DDS), and various other forms of attack in the message streams. If abnormalities or exceeded limits are detected, audit module 1225 tears down the associated connections, and transmits alarms to user 115 and/or agent 125.

In summary, described herein are a method, a system, devices, and computer readable media that permit trust-based authorizations for remote agents (e.g., user devices) to use private resources (e.g., Internet of Things devices, such as consumer electronics). The example embodiments described herein include those in which call center agents are permitted to access local resources like printers or cameras without a complex authorization process. This authorization is achieved using a discovery protocol, and the devices may be managed during the session by a gateway device and proxy agent. Also described herein are gateway and proxy systems that act as bridges between external agents, such as call center agents, and devices those agents may want to access. Included in the gateway and proxy systems are communication, authorization, authentication, and protocol processing functions that facilitate simple, secure, high performance interactions between remote agents and different classes of Internet of Things devices.

Accordingly, the techniques described herein allow remote agents to access local resources in a trustworthy way, and preserve the privacy and security of local devices unless their use is explicitly authorized. The techniques described herein also provide and manage temporary access to local devices, establish and preserve control of device access irrespective of the location of the device and user, establish and preserve control of device access irrespective of whether the device is administered by the user, the contact center or a third party, and provide access and control that is resilient to network conditions. The techniques described herein also provide a single point of access control to various home devices, manage external access to home devices based on user control, integrate and synchronize communication with user and device access, keep access control separate from specific data services and protocols, and support new data services without changing the gateway device. Furthermore, the techniques described herein work with cloud hosted device management and identity functions, and can support multiple utility providers at the same time.

Furthermore, the techniques described herein can provide secure access for a contact center agent that is not associated with a consumer's call into the contact center, regardless of whether the devices are located near to the caller or at a different location. The techniques described herein also provide secure access whether the device is under the consumer's administrative control or under the administrative control of a third party. Finally, the techniques described herein provide control of this access to the consumer and the party that has control of the device, even when access is beyond the duration of the consumer's session with the contact center.

The above description is intended by way of example only.

What is claimed is:

1. A method comprising:
  establishing, at a first network connected device, a trust relationship between the first network connected device and a second network connected device;
  establishing a communication session between the first network connected device and a third network connected device, wherein the third network connected device lacks a trust relationship with the second network connected device;
  receiving at the first network connected device from the third network connected device a security token; and
  receiving at the first network connected device a second security token from the second network connected device;
  sending a message from the first network connected device to the second network connected device, wherein the message includes the security token; and
  sending a second message from the first network connected device to the third network connected device, wherein the second message includes the second security token;
  wherein the security token and the second security token are configured to be exchanged between the second network connected device and the third network connected device to establish a communication session between the third network connected device and the second network connected device based on the trust relationship between the first network connected device and the second network connected device.

2. The method of claim 1, wherein the second network connected device comprises a gateway device and controls access to a fourth network connected device.

3. The method of claim 2, further comprising the gateway device monitoring communications between the third network connected device and the fourth network connected device.

4. The method of claim 3, wherein monitoring the communications comprises filtering, modifying, and/or analyzing the content of the communications.

5. The method of claim 2, wherein the communication session between the third network connected device and the second network connected device comprises messages sent according to a first protocol, wherein the first protocol is different from a second protocol utilized by the gateway device to communicate with the fourth network connected device; and
causing the gateway device to translate the messages sent in the communication session between the third network connected device and the second network connected device from the first protocol to the second protocol.

6. The method of claim 2, further comprising establishing a communication session between the third network connected device and the fourth network connected device, and wherein messages in the communication session between the third network connected device and the fourth network connected device pass through the gateway device.

7. The method of claim 2, further comprising establishing a communication session between the third network connected device and the fourth network connected device, and wherein messages in the communication session between the third network connected device and the fourth network connected device are communicated directly between the third network connected device and the fourth network connected device.

8. The method of claim 1, wherein at least one of the message or the second message includes information indicating at least one of a time duration during which the third network connected device is authorized to communicate with the second network connected device or a resource limit on services the third network connected device is authorized to access on the second network connected device.

9. The method of claim 1, wherein at least one of the message or the second message comprises information indicating a level of access at which the third network connected device may access the second network connected device.

10. The method of claim 1, further comprising monitoring, at the first network connected device, communications of the communication session between the second network connected device and the third network connected device.

11. The method of claim 10, further comprising terminating the communication session between the second network connected device and the third network connected device in response to the monitoring.

12. The method of claim 1, further comprising evaluating the communication session between the third network connected device and the second network connected device for at least one of evidence of hacking, forged tokens or signs of attacks;

detecting at least one of the evidence of hacking, forged tokens or signs of attacks; and
tearing down the communication session between the third network connected device and the second network connected device in response to the detecting.

13. An apparatus comprising:
a network interface unit configured to enable network communications; and
a hardware processor coupled to the network interface unit, and configured to
establish a trust relationship with a first network connected device;
establish a communication session with a second network connected device, wherein the second network connected device lacks a trust relationship with the first network connected device;
receive, via the network interface unit, from the second network connected device a security token;
receive, via the network interface unit, from the first network connected device a second security token;
send a message via the network interface unit to the first network connected device, wherein the message includes the security token; and
send a second message via the network interface unit to the second network connected device, wherein the second message includes the second security token;
wherein the security token and the second security toke are configured to be exchanged between the first network connected device and the second network connected device to establish a communication session between the second network connected device and the first network connected device based on the trust relationship with the first network connected device.

14. The apparatus of claim 13, wherein the hardware processor is configured to send the message to a gateway device, wherein the gateway device comprises the first network connected device and controls access to a third network connected device.

15. The apparatus of claim 14, wherein the hardware processor is configured to send the message according to a first protocol, wherein the first protocol is different from a second protocol utilized by the gateway device to communicate with the third network connected device.

16. The apparatus of claim 13, wherein at least one of the message or the second message includes a level of access at which the second network connected device may access the first network connected device.

17. The apparatus of claim 13, wherein the hardware processor is configured to:
evaluate the communication session between the second network connected device and the first network connected device for at least one of evidence of hacking, forged tokens or signs of attacks;
detect at least one of the evidence of hacking, forged tokens or signs of attacks; and
tear down the communication session between the second network connected device and the first network connected device in response to the detecting.

18. One or more tangible, non-transitory computer readable storage media encoded with software comprising computer executable instructions and when the software is executed operable to perform operations comprising:
establish, at a first network connected device, a trust relationship between the first network connected device and a second network connected device;

establish a communication session between the first network connected device and a third network connected device, wherein the third network connected device lacks a trust relationship with the second network connected device;

receive at the first network connected device from the third network connected device a security token; and receive at the first network connected device a second security token from the second network connected device;

send a message from the first network connected device to the second network connected device, wherein the message includes the security token; and send a second message from the first network connected device to the third network connected device, wherein the second message includes the second security token;

wherein the security token and the second security token are configured to be exchanged between the second network connected device and the third network connected device to establish a communication session between the third network connected device and the second network connected device based on the trust relationship between the first network connected device and the second network connected device.

19. The non-transitory computer readable storage media of claim 18, wherein the second network connected device comprises a gateway device and controls access to a fourth network connected device.

20. The non-transitory computer readable storage media of claim 19, wherein the gateway device monitors communications between the third network connected device and the fourth network connected device.

21. The non-transitory computer readable storage media of claim 19, wherein the software further comprises instructions operable to send the message according to a first protocol, wherein the first protocol is different from a second protocol utilized by the gateway device to communicate with the fourth network connected device.

22. The non-transitory computer readable storage media of claim 19, wherein the software further comprises instructions operable to:

evaluate the communication session between the third network connected device and the second network connected device for at least one of evidence of hacking, forged tokens or signs of attacks;

detect at least one of the evidence of hacking, forged tokens or signs of attacks; and tear down the communication session between the third network connected device and the second network connected device in response to the detecting.

23. The non-transitory computer readable storage media of claim 18, wherein at least one of the message or the second message includes information indicating at least one of a time duration during which the third network connected device is authorized to communicate with the second network connected device or a resource limit on services the third network connected device is authorized to access on the second network connected device.

24. The non-transitory computer readable storage media of claim 18, wherein at least one of the message or the second message comprises information indicating a level of access at which the third network connected device may access the second network connected device.

* * * * *